(12) United States Patent
Bohrer et al.

(10) Patent No.: US 6,711,650 B1
(45) Date of Patent: Mar. 23, 2004

(54) METHOD AND APPARATUS FOR ACCELERATING INPUT/OUTPUT PROCESSING USING CACHE INJECTIONS

(75) Inventors: Patrick Joseph Bohrer, Austin, TX (US); Ramakrishnan Rajamony, Austin, TX (US); Hazim Shafi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/289,817

(22) Filed: Nov. 7, 2002

(51) Int. Cl.[7] .............................................. G06F 12/02
(52) U.S. Cl. .......................... 711/118; 710/22; 710/52; 711/130; 711/137; 711/141; 711/142; 711/143
(58) Field of Search ..................... 710/22, 52; 711/118, 711/130, 137, 141–143

(56) References Cited

U.S. PATENT DOCUMENTS

| | | | |
|---|---|---|---|
| 4,504,902 A | * | 3/1985 | Gallaher et al. ............ 711/135 |
| 5,802,576 A | * | 9/1998 | Tzeng et al. ................ 711/146 |
| 5,884,100 A | * | 3/1999 | Normoyle et al. ............ 710/52 |
| 6,584,513 B1 | * | 6/2003 | Kallat et al. .................. 710/22 |

OTHER PUBLICATIONS

Milutinovic et al , "The cache injection/cofectch architecture: initial performance evaluation" Proceedings Figth International sumposium. 1997. pp. 63–64.*

Milenkovic et al , "Cache injection on bus based multiprocessors" Proceedings. Seventeenth IEEE Sumposium. Oct. 1998. pp. 341–346.*

* cited by examiner

*Primary Examiner*—T Nguyen
(74) *Attorney, Agent, or Firm*—Casimer K. Salys; Bracewell & Patterson, L.L.P.

(57) ABSTRACT

A method for accelerating input/output operations within a data processing system is disclosed. Initially, a determination is initially made in a cache controller as to whether or not a bus operation is a data transfer from a first memory to a second memory without intervening communications through a processor, such as a direct memory access (DMA) transfer. If the bus operation is such data transfer, a determination is made in a cache memory as to whether or not the cache memory includes a copy of data from the data transfer. If the cache memory does not include a copy of data from the data transfer, a cache line is allocated within the cache memory to store a copy of data from the data transfer.

14 Claims, 3 Drawing Sheets

METHOD AND APPARATUS FOR ACCELERATING INPUT/OUTPUT PROCESSING USING CACHE INJECTIONS

BACKGROUND OF THE INVENTION

1. Technical Field

The present invention relates to input/output operations in general, and in particular to a method and apparatus for accelerating input/output operations. Still more particularly, the present invention relates to a method and apparatus for accelerating input/output processing using cache injections.

2. Description of the Related Art

Generally speaking, a processor typically controls and coordinates the execution of instructions within a data processing system. Ancillary to the instruction execution, the processor must frequently move data from a system memory or a peripheral input/output (I/O) device into the processor for processing, and out of the processor to the system memory or the peripheral I/O device after processing. Thus, the processor often has to coordinate the movement of data from one memory device to another memory device. In contrast, direct memory access (DMA) transfers are the transferring of data from one memory device to another memory device across a system bus within a data processing system without intervening communication through a processor.

In a typical data processing system, DMA transfers are commonly utilized to overlap memory copy operations from I/O devices with useful work by a processor. Typically, an I/O device, such as a network controller or a disk controller, initiates a DMA transfer from an I/O device, following which transfer the processor is interrupted to inform the processor of the completion of the data transfer. The processor will eventually handle interrupt by performing any required processing on the data transferred from the I/O device before the data is passed to an user application that utilizes the data. The user application requiring the same data may also cause additional processing on the data received from the I/O device.

Many data processing systems incorporate cache coherence mechanisms to ensure copies of data in a processor cache are consistent with the same data stored in a system memory or other processor caches. In order to maintain data coherency between the system memory and the processor cache, a DMA transfer to the system memory will result in the invalidation of the cache lines in the processor cache containing copies of the same data stored in the memory address region affected by the DMA transfer. However, those invalidated cache lines may still be needed by the processor in an imminent future to perform I/O processing or other user application functions. Thus, when the processor needs to access the data in the invalidated cache lines, the processor has to fetch the data from the system memory, which may take up to tens or hundreds of processor cycles per cache line accessed. The present disclosure provides a solution to the above-mentioned problem.

SUMMARY OF THE INVENTION

In accordance with a preferred embodiment of the present invention, a determination is made in a cache controller as to whether or not a bus operation is a data transfer from a first memory to a second memory without intervening communications through a processor, such as a direct memory access (DMA) transfer. If the bus operation is such a data transfer, a determination is made in a cache memory as to whether or not the cache memory includes a copy of data from the data transfer. If the cache memory does not include a copy of data from the data transfer, a cache line is allocated within the cache memory to store a copy of data from the data transfer and the data are copied into the allocated cache line as the data transfer proceeds. If the cache memory does include a copy of the data being modified by the data transfer, the cache controller updates the copy of the data within the cache memory with the new data during the data transfer.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
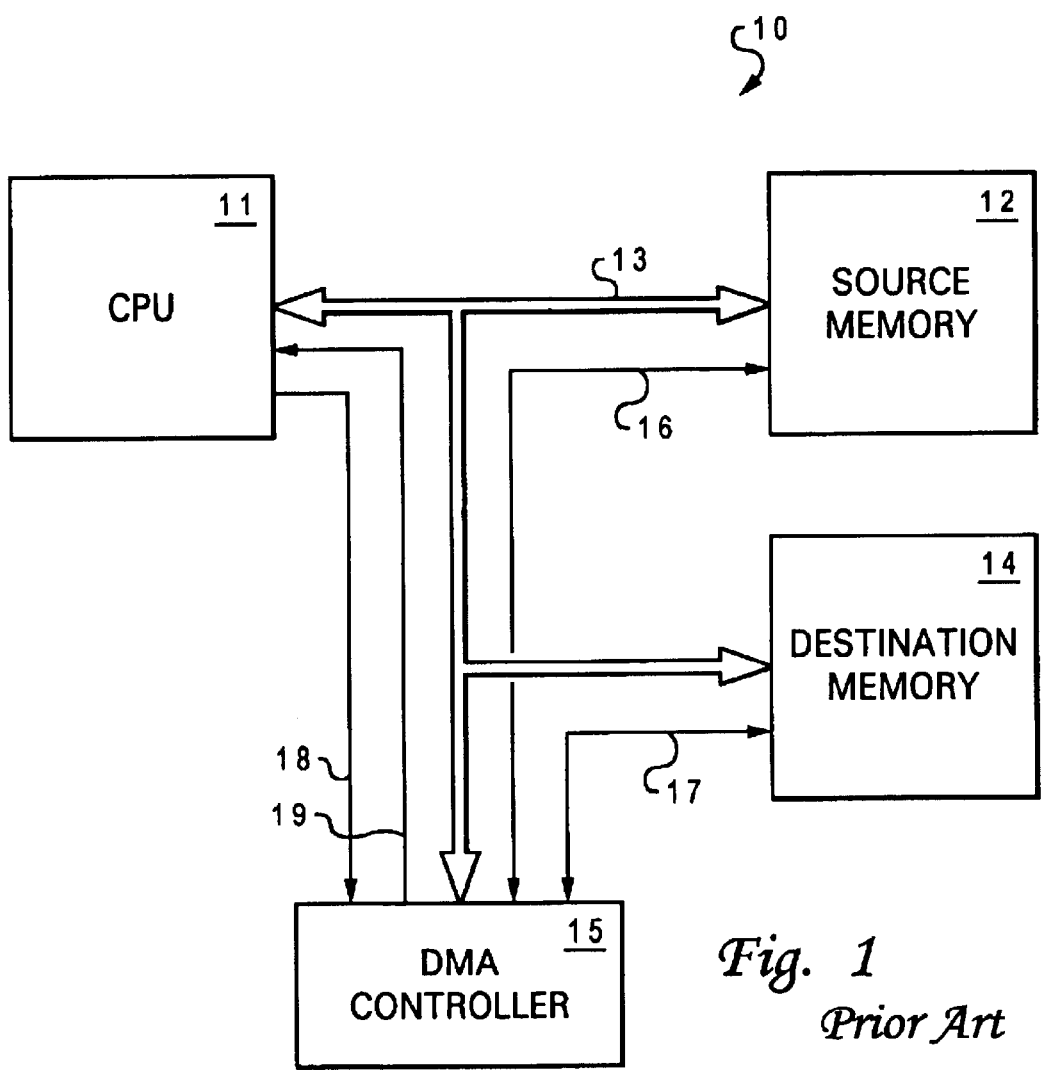
FIG. 1 is a block diagram of a data processing system that utilizes a conventional direct memory access transfer.

Referring now to the drawings and, in particular, to FIG. 1, there is depicted a block diagram of a data processing system that utilizes a conventional direct memory access (DMA) transfer. As shown, a data processing system 10 includes a central processing unit (CPU) 11 coupled to a source memory 12, a destination memory 14 and a DMA controller 15 via a system bus 13. DMA controller 15 is connected to source memory 12 and destination memory 14 via signal lines 16 and 17, respectively. DMA controller 15 is also connected to CPU 11 via an acknowledge line 18 and a request line 19. During a DMA operation, data may be directly transferred from source memory 12 to destination memory 14 across system bus 13 without having to transition through CPU 11.

A DMA transfer includes three primary steps as follows. Initially, CPU 11 sets up the DMA transfer by supplying DMA controller 15 with the identity of source memory 12 and destination memory 14, the address of the first byte to be transferred from source memory 12 as well as the number of bytes to be transferred. After receiving the above-mentioned information, DMA controller 15 starts the DMA operation by either taking control of system bus 13 or otherwise requesting shared control of system bus 13 with other devices (not shown). Once DMA controller 15 has control of system bus 13, DMA controller 15 initiates the DMA transfer on system bus 13.

Utilizing control lines 16 and 17, DMA controller 15 may orchestrate data transfer from source memory 12 to destination memory 14. DMA controller 15 may control the address supplied on system bus 13 as well as the chip select and enable lines necessary in order to read data from a select memory address location of source memory 12 and write that same data to a select memory address location in destination memory 14. Once the DMA transfer has been completed, DMA controller 15 may interrupt CPU 11 to inform CPU 11 the completion of the DMA transfer accordingly. Throughout the duration of the DMA transfer, CPU 11 may be performing various processing operations concurrently.

Figure 2:
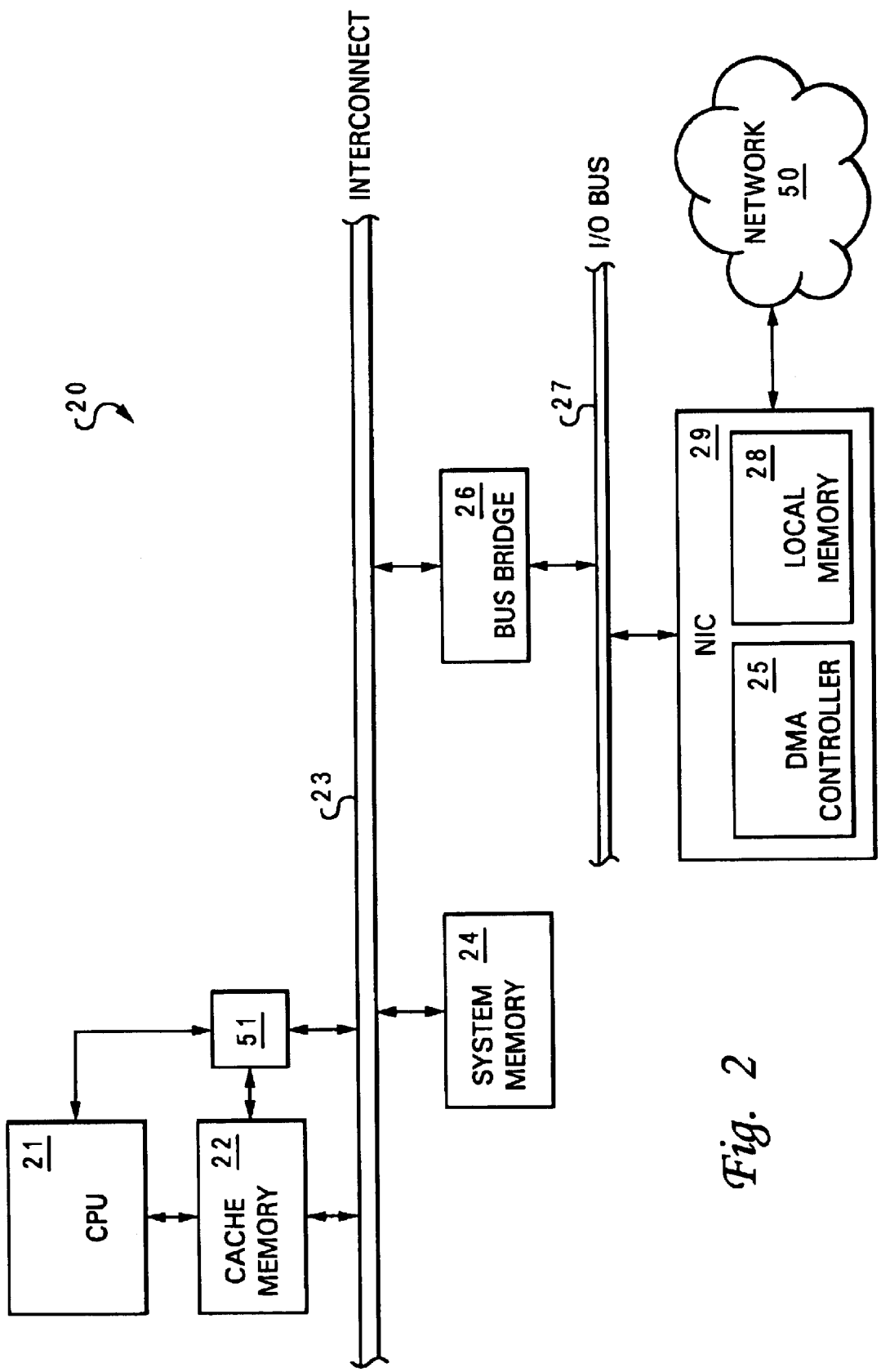
FIG. 2 is a block diagram of a data processing system that utilizes a direct memory access transfer according to a preferred embodiment of the present invention.

With reference now to FIG. 2, there is depicted a block diagram of a data processing system that utilizes a DMA transfer in accordance with a preferred embodiment of the present invention. As shown, a data processing system 20 includes a CPU 21 having a cache memory 22 coupled to a system memory 24 and a bus bridge 26 via an interconnect 23. CPU 21 also couples to a cache controller 51 for controlling cache memory 22. Bus bridge 26 is coupled between interconnect 23 and an input/output (I/O) bus 27. In the present embodiment, a network interface card (NIC) provides data connection between data processing system 20 and a network 50. Network 50 can be a local-area network (LAN), a wide-area network (WAN) or a global network such as the Internet. NIC 29 includes a DMA controller 25 and a local memory 28 for receiving data packets from network 50. Other well-known signal lines connected among CPU 21, system memory 24, local memory 28 and DMA controller 25, which are similar to those shown in FIG. 1, are not shown in FIG. 2. During a DMA transfer, data may be directly transferred from local memory 28 to system memory 24 across interconnect 13 without having to transition through CPU 21.

Cache controller 51 always "sees" the traffic on interconnect 23 for the implementation of a cache coherence protocol. As mentioned previously, in order to maintain data coherency between cache memory 22 and system memory 24, a DMA transfer to system memory 24 according to the prior art will result in the invalidation of the cache lines in cache memory 22 containing copies of the same data stored in the region of system memory 24 affected by the DMA transfer.

In accordance with a preferred embodiment of the present invention, cache controller 51 is modified to recognize DMA transfers. In other words, cache controller 51 is modified to recognize a specific type of data being transferred on interconnect 23 as a DMA transfer between two devices, such as between local memory 28 and system memory 24. One implementation requires designating a specific range of address locations of system memory 24 to be solely for the purpose of DMA transfer, and if there is a bus write operation to that designated range of address locations, cache controller 51 will immediately realize the bus write operation is from a DMA transfer. Another implementation for cache controller 51 to recognize a DMA transfer on interconnect 23 is by including a hint bit in a DMA transfer command. After snooping the data from interconnect 23, cache controller 51 updates any corresponding cache lines within cache memory 22 that contain a version of the data from the DMA transfer. As such, the corresponding cache lines within cache memory 22 can retain their respective valid coherency states, such as modified or shared, instead of being forced to become invalid. If cache memory 22 does not contain a version of the data from the DMA transfer, cache controller 51 will allocate a cache line for storing the data from the DMA transfer—cache injection.

Figure 3:
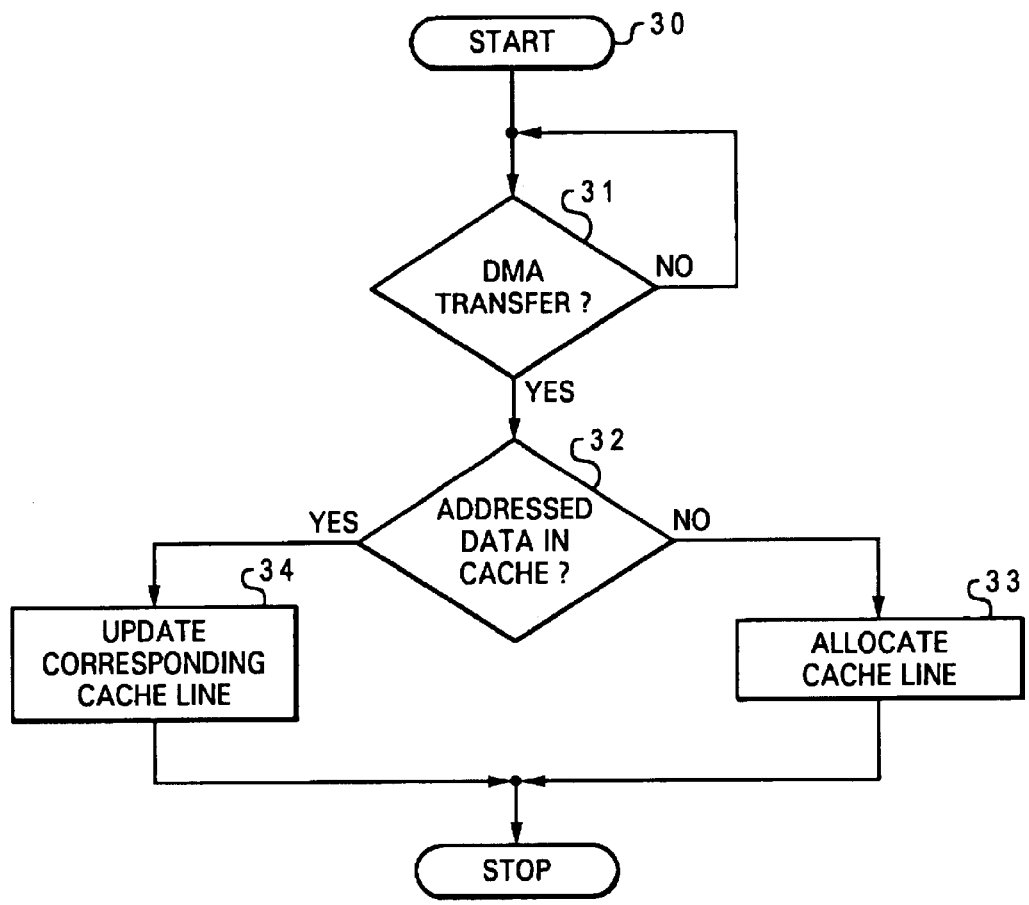
FIG. 3 is a high-level logic flow diagram of a method for accelerating input/output processing within a data processing system, in accordance with a preferred embodiment of the present invention.

Referring now to FIG. 3, there is depicted a high-level logic flow diagram of a method for accelerating I/O processing within a data processing system, in accordance with a preferred embodiment of the present invention. Starting at block 30, a determination is made as to whether or not a bus transaction is a DMA transfer, as shown in block 31. If the bus transaction is a DMA transfer, another determination is made as to whether or not the data associated with the DMA transfer has a version stored in a cache line within a cache memory, as depicted in block 32. If the data associated with the DMA transfer does not have a version stored in the cache memory, then a cache line is allocated within the cache memory to store the data associated with the DMA transfer, as shown in block 33. Otherwise, if the data associated with the DMA transfer has a version stored in the cache memory, the corresponding cache line within the cache memory is updated with the data associated with the DMA transfer, as depicted in block 34.

As has been described, the present invention provides a method for accelerating I/O processing within a data processing system. The present invention minimizes, or even eliminates, any cache misses that are attributed to DMA transfers by enabling injection of DMA data into a cache memory of a data processing system. Although a data processing system having only one level of cache memory is utilized to illustrate the present invention, it is understood by those skilled in the art that the present invention is also applicable to data processing systems having multiple level of cache memories such as level two (L2) caches and level three (L3) caches.

The present invention should not be affected by any cache interference issue due to the following reasons. First, the data in question will be brought in anyway, so cache interference is just going to occur sooner. Second, L2/L3 caches are becoming larger with larger set-associativities, which may reduce the adverse effects of cache interference. Third, many cache partitioning schemes can be leveraged to completely eliminate cache interference at the cost of a reduced effective cache size for other applications. Finally, cache interference due to caching data that will not be read by a processor can be mitigated or completely avoided by allowing software control over cache injection when DMA transfers are being set up.

While the invention has been particularly shown and described with reference to a preferred embodiment, it will be understood by those skilled in the art that various changes in form and detail may be made therein without departing from the spirit and scope of the invention.

What is claimed is:

1. A method for accelerating input/output processing within a data processing system, said method comprising:
   determining in a cache controller as to whether or not a command includes a hint bit to indicate a bus operation is a direct memory access transfer from a first memory to a second memory without intervening communications through a processor;
   in a determination that said bus operation is said data transfer, determining in a cache controller whether or not said cache memory includes a copy of data from said data transfer; and
   in a determination that said cache memory does not include a copy of data from said data transfer, allocating a cache line within said cache memory to store a copy of data from said data transfer.

2. The method of claim 1, wherein said method further includes updating a corresponding cache line within said cache memory with data associated with said data transfer, in a determination that said cache memory includes a copy of data from said data transfer.

3. The method of claim 1, wherein said first memory is a local memory and said second memory is a system memory.

4. The method of claim 3, wherein said local memory resides on a network interface card.

5. The method of claim 1, wherein said determining in a cache controller further includes determining whether or not said bus operation is a write operation to an address within a predetermined address range of said second memory.

6. A data processing system, comprising:
- a processing unit having a cache memory;
- an interconnect coupled to said processing unit;
- a first memory coupled to said interconnect;
- a second memory coupled to said interconnect; and
- a cache controller coupled to said processing unit and said interconnect, wherein said cache controller includes
  - means for determining whether or not a command includes a hint bit to indicate a bus operation is a direct memory access transfer from a first memory to a second memory without intervening communications through a processor;
  - means for determining whether or not said cache memory includes a copy of data from said data transfer, in a determination that said bus operation is said data transfer; and
  - means for allocating a cache line within said cache memory to store a copy of data from said data transfer, in a determination that said cache memory does not include a copy of data from said data transfer.

7. The data processing system of claim 6, wherein said data processing system further includes means for updating a corresponding cache line within said cache memory with data associated with said data transfer, in a determination that said cache memory includes a copy of data from said data transfer.

8. The data processing system of claim 6, wherein said first memory is a local memory and said second memory is a system memory.

9. The data processing system of claim 8, wherein said local memory resides on a network interface card.

10. The data processing system of claim 6, wherein said means for determining a bus operation further includes means for determining whether or not said bus operation is a write operation to an address within a predetermined address range of said second memory.

11. A cache controller for accelerating input/output processing within a data processing system having a cache memory, said cache controller comprising:
- means for determining whether or not a command includes a hint bit to indicate a bus operation is a direct memory access transfer from a first memory to a second memory without intervening communications through a processor;
- means for determining whether or not said cache memory includes a copy of data from said data transfer, in a determination that said bus operation is said data transfer; and
- means for allocating a cache line within said cache memory to store a copy of data from said data transfer, in a determination that said cache memory does not include a copy of data from said data transfer.

12. The cache controller of claim 11, wherein said cache controller further includes means for updating a corresponding cache line within said cache memory with data associated with said data transfer, in a determination that said cache memory includes a copy of data from said data transfer.

13. The cache controller of claim 11, wherein said first memory is a local memory and said second memory is a system memory.

14. The cache controller of claim 11, wherein said determining in a cache controller further includes determining whether or not said bus operation is a write operation to an address within a predetermined address range of said second memory.

* * * * *